United States Patent [19]

Nakano

[11] Patent Number: 4,707,798
[45] Date of Patent: Nov. 17, 1987

[54] METHOD AND APPARATUS FOR DIVISION USING INTERPOLATION APPROXIMATION

[75] Inventor: Hiraku Nakano, Hadano, Japan

[73] Assignee: Hitachi, Ltd., Tokyo, Japan

[21] Appl. No.: 687,912

[22] Filed: Dec. 31, 1984

[30] Foreign Application Priority Data

Dec. 30, 1983 [JP] Japan ................................ 58-247646

[51] Int. Cl.$^4$ .............................................. G06F 7/52
[52] U.S. Cl. .................................................. 364/765
[58] Field of Search ........................ 364/761, 765, 767

[56] References Cited

U.S. PATENT DOCUMENTS

| 3,508,038 | 4/1970 | Goldschmidt et al. | 364/765 |
| 3,633,018 | 1/1972 | Ling | 364/765 |
| 3,648,038 | 3/1972 | Sierra | 364/765 |
| 3,777,132 | 12/1973 | Bennett, Jr. | 364/765 |
| 3,828,175 | 8/1974 | Amdahl et al. | 364/765 |
| 4,025,773 | 5/1977 | Bennett | 364/765 |
| 4,488,247 | 12/1984 | Inagami et al. | 364/765 |

OTHER PUBLICATIONS

Ferrari, "A Division Method Using a Parallel Multiplier", IEEE Trans. on Elec. Comp., Apr. 1967, pp. 224–226.
Freiman et al., "Composite Division Unit", IBM Tech. Disc. Bull., vol. 9, No. 8, Jan. 1967, pp. 994–995.
Flynn, "On Division by Functional Iteration", IEEE Trans. on Comp., vol. C-19, No. 8, Aug. 1970, pp. 702–706.
Chen, "Efficient Arithmetic Apparatus and Method", IBM Tech. Disc. Bull., vol. 14, No. 1, Jun. 1971, pp. 328–330.
Stefanelli, "A Suggestion for a High-Speed Parallel Binary Divider", IEEE Trans. on Comp., vol. C-21, No. 1, Jan. 1972, pp. 42–55.
Davis et al., "A High-Speed Digital Divider", IEEE Trans. on Instrument & Measurement, vol. IM-32, No. 2, Jun. 1983, pp. 309–312.

*Primary Examiner*—Gary V. Harkcom
*Assistant Examiner*—Tan V. Mai
*Attorney, Agent, or Firm*—Antonelli, Terry & Wands

[57] ABSTRACT

A divide method and a divide apparatus for use in a data processing system. The divisor and dividend are normalized in a normalization circuit. A table unit stores a plurality of approximate reciprocal divisors and differences between adjacent approximate reciprocal divisors and is addressed by the high-order bits of the normalized divisor. The approximate reciprocal divisor read out from the table unit is, in an interpolation approximation circuit, changed into an interpolation approximated approximate reciprocal divisor in accordance with a plurality of bits following the high-order bits and the difference. A multiplication unit multiplies the interpolation approximated approximate reciprocal divisor by the normalized dividend to output a quotient.

8 Claims, 7 Drawing Figures

| $D_{0,12}$ | $D_{0,13}$ | $D_{0,14}$ | GENERATED MULTIPLE ||
|---|---|---|---|---|
| | | | ML 0 | ML 1 |
| 0 | 0 | 0 | ZERO | ZERO |
| 0 | 0 | 1 | ZERO | $2^{-3}\Delta$ |
| 0 | 1 | 0 | $2^{-1}\Delta$ | $-2^{-2}\Delta$ |
| 0 | 1 | 1 | $2^{-1}\Delta$ | $-2^{-3}\Delta$ |
| 1 | 0 | 0 | $2^{-1}\Delta$ | ZERO |
| 1 | 0 | 1 | $2^{-1}\Delta$ | $2^{-3}\Delta$ |
| 1 | 1 | 0 | $\Delta$ | $-2^{-2}\Delta$ |
| 1 | 1 | 1 | $\Delta$ | $-2^{-3}\Delta$ |

METHOD AND APPARATUS FOR DIVISION USING INTERPOLATION APPROXIMATION

BACKGROUND OF THE INVENTION

The present invention relates to a divide method and apparatus for use in a data processing system.

In order to simplify the calculations in a divide apparatus, approximations of the given dividend and given divisor are employed so that inaccuracies may be introduced into the quotient.

In a known prior art method for improving the accuracy of an approximate reciprocal divisor, a 1st approximate reciprocal divisor is obtained from a lookup table by using the high-order bits of the normalized divisor as an address, and a second approximate reciprocal divisor is obtained by multiplying the 1st approximate reciprocal divisor by the two's complement of the product of the 1st approximate reciprocal divisor and the normalized divisor. That is, the 2nd approximate reciprocal divisor $R_1$ can be obtained by $$R_1 = R_0 \times (2 - D_0 \times R_0)$$

where $D_0$ is a normalized divisor, $R_0$ is a 1st approximate reciprocal divisor, $R_1$ is a 2nd approximate reciprocal divisor, $\alpha$ is a positive integer, and $|1 - D_0 \times R_0| < 2^{-\alpha}$. In this case, the accuracy of the reciprocal of $R_1$ is:

$$|1 - D_0 \times R_1| = |1 - D_0 \times R_0(2 - D_0 \times R_0)|$$
$$= |(1 - D_0 \times R_0)^2| < 2^{-2\alpha}$$

The above method, however, requires two multiplications in order to obtain $R_1$.

Further, in a prior divide apparatus in which a partial remainder is calculated in the form of a remainder multiplied by an approxiamte reciprocal divisor, and in which successive iterations are performed such that the higher order bits of the partial remainder become the partial quotient, the following case may happen. That is, in the case that a quotient is calculated up to the desired bits by using an approximate reciprocal divisor smaller than a correct reciprocal divisor, and that the dividend is assumed to be equal to the divisor, the quotient does not always become 1, but it becomes in a binary notation a number such as having 1's from below the radix point down to the lowest order bit. Thus, the quotient calculated by successive iterations may become smaller than the correct quotient by the lowest order bit 1, when compared down to the desired lowest bit. Therefore, if the product of the number obtained by adding 1 to the lowest order bit of the quotient calculated through successive iterations and the divisor is equal to or smaller than the dividend, then the number obtained by adding 1 to the lowest order bit of the quotient calculated through successive iterations is concluded as a final quotient. This, however, takes a fairly long time to check and correct the quotient.

One example of prior art divide methods and divide apparatuses is disclosed in U.S. Pat. No. 3,828,175.

SUMMARY OF THE INVENTION

It is an object of the present invention to provide a divide method and a divide apparatus which can obtain an approximate reciprocal divisor with high accuracy.

It is another object of the present invention to provide a divide method and a divide apparatus which can shorten the time required for performing check and correction after the quotient is calculated through successive iterations.

The present invention improves the accuracy of an approximate reciprocal divisor by employing interpolation approximation. The divisor and dividend are normalized in a normalizing circuit. A table unit stores a plurality of approximate reciprocal divisors and differences between respective adjacent approximate reciprocal divisors, and is addressed by the high-order bits of the normalized divisor. (A pair of) An approximate reciprocal divisor and a difference read out of the table unit are given to an interpolation approximation circuit. The interpolation approximation circuit effects a proportional allotment of the difference in accordance with the several bits following the high-order bits of the normalized divisor as the address of the table unit, and adds the alloted difference to the input approximate reciprocal divisor. The approximate reciprocal divisor added with the value of proportionally alloted difference is given to a multiplier circuit to obtain through successive iterations the quotient.

BRIEF DESCRIPTION OF THE DRAWINGS

The present invention will be apparent from the following detailed description taken in conjunction with the accompanying drawings, in which.

DESCRIPTION OF A PREFERRED EMBODIMENT

Prior to giving the description of a particular embodiment according to the present invention, a principle of division applied to the present invention will be described.

The following interpolation approximation is employed in order to improve the accuracy of an approximate reciprocal divisor, and in this case, to obtain an approximate reciprocal divisor the multiplication is performed only once, and in addition only several numbers of bits are sufficient for the multiplier.

For an address n by which a corresponding information is accessed to retrieve it from a look-up table, a variable $x_n$ is expressed as:

$$x_n = 2^{-1} + n \cdot 2^{-\alpha} (n = 0, 1, 2, \ldots, 2^{\alpha-1} - 1)$$

An approximate reciprocal divisor $f(x_n)$ and a difference $\Delta_n$ between the adjacent approximate reciprocal divisors obtained through $$f(x_n) = 1/x_n$$

$$\Delta_n = f(x_{n+1}) - f(x_n)$$

(wherein $f(x_n+1)=1$, wherein $n=2^{\alpha-1}$)
are stored as a table information, and an approximate reciprocal divisor associated with $x_n+h$ can be obtained through $$f(x_n+h) = f(x_n) + h \cdot \Delta_n \quad (0 \leq h < 2^{-\alpha})$$

As to the check and correction of the quotient, these processings can be included within the successive iterations if the following divide method is employed. Therefore, the processings to multiply the divisor by the number obtained by adding 1 to the lowest bit of the quotient calculated through successive iterations as described above can be dispensed with.

Whether a fixed point notation without an exponent term or a floating point notation with an exponent term is used for representing a number, in order to perform a division of a P base number, first the divisor and the dividend are normalized so that they may be represented by the equations (1) and (2), and an intermediary quotient is calculated wherein $D_0$ denotes a divisor after being normalized and $N_0$ denotes a dividend after being normalized.

$$D_0 = \sum_{k=1}^{n} D_{0,k} \times P^{-k} \quad \begin{bmatrix} D_{0,k} \text{ is zero or a} \\ \text{positive integer} \\ 0 \leq D_{0,k} < P, \\ D_{0,1} \neq 0 \end{bmatrix} \quad (1)$$

$$N_0 = \sum_{k=1}^{n} N_{0,k} \times P^{-k} \quad \begin{matrix} N_{0,k} \text{ is zero or a} \\ \text{positive integer} \\ 0 \leq N_{0,k} < P, \\ N_{0,1} \neq 0 \end{matrix} \quad (2)$$

The intermediary quotient Q obtained is within a range of the formula (3), that is, either in a normalized form or in an overflowing-by-one-digit form.

$$P^{-1} < Q < P \quad (3)$$

$$\therefore \frac{P^{-1}}{\sum_{k=1}^{\infty}(P-1) \times P^{-k}} < Q = \frac{N_0}{D_0} < \frac{\sum_{k=1}^{\infty}(P-1) \times P^{-k}}{P^{-1}}$$

After calculating the intermediary quotient, on the one hand in the case of a fixed point notation, the number of digit shift counts required for normalizing the divisor is subtracted by the number of digit shift counts required for normalizing the dividend, and if the resultant difference is positive (digit shift to the left is assumed positive), the intermediary quotient Q is shifted to the left by the difference number of digit shift counts, while if the difference is negative, then the intermediary quotient Q is shifted to the right by the difference number of digit shifts counts, so that a final quotient can be obtained.

On the other hand, in a floating point notation, the addition result of the difference obtained by subtracting the exponent term of the divisor from the exponent term of the dividend, and the difference obtained by subtracting the number of digit shift counts required for normalizing the fixed point term of the divisor from the number of digit shift counts required for normalizing the dividend, is used as an exponent term of the division result, and further if the intermediary quotient is in an overflow form, the exponent term is added by 1 to make the fixed point term normalized, so that a final quotient can be obtained.

Since a sign for the quotient can be algebraically determined by the signs of the divisor and dividend, the intermediary quotient may be calculated by using, if required, the absolute and normalized values of the divisor and dividend, and if the final quotient is negative, then the intermediary quotient is changed to have a desired representation.

With the above assumptions, the divisor and dividend are dealt with in the absolute and normalized form as in the formulas (1) and (2) hereinafter. First, symbols used herein will be described.

M: approximate reciprocal divisor of $D_0$ $Q_i$: i th partial quotient $Q_i^*$: i th partial quotient after correction $R_i$: i th partial remainder where $R_0 = N_0$ $N_i$: number obtained by subtracting $Q_i$ from the product of $R_{i-1}$ and M A: number multiplied by $Q_i$ when $Q_{i+1}+N_{i+1}$, which is M times as large as the i th partial remainder $R_i$, is calculated from $Q_i$, $N_i$ $\alpha$: the number of digits of a second or following partial quotient Q: correct quotient which becomes recurring decimals and has the infinite number of digits if the dividend can not be divided by the divisor without leaving a remainder A sufficient condition for obtaining $\alpha$ digits in the second and following partial quotients is determined by so selecting M as to suffice the formula (4).

$$1 \leq D_0 \times M < 1 + P^{-(\alpha+1)} \quad (4)$$

Prior to proceed with successive iterations, the calculations shown by the formulas (5) and (6) are performed.

$$A = 1 - D_0 \times M \quad (5)$$

$$Q_1 + N_1 = N_0 \times M \quad (6)$$

In the successive iterations, the partial quotient is solved and the preceding one is corrected in such a way as shown in the following formulas.

$$Q_i + N_i = A \times Q_{i-1} + N_{i-1} \quad (i \geq 0) \quad (7)$$

correction of partial quotient
for $Q_{i-1}+N_{i-1} \geq 0$, $Q_i+N_i \geq 0$ $$Q_{i-1}^* = Q_{i-1} \quad (8)$$

for $Q_{i-1}+N_{i-1} \geq 0$, $Q_i+N_i \geq 0$ $$Q_{i-1}^* = Q_{i-1} - P^{-(i-1)\alpha} \quad (9)$$

for $Q_{i-1}+N_{i-1} < 0$, $Q_i+N_i \geq 0$ $$Q_{i-1}^* = Q_{i-1} + P^{-(i-1)\alpha} \quad (10)$$

for $Q_{i-1}+N_{i-1} < 0$, $Q_i+N_i < 0$ $$Q_{i-1}^* = Q_{i-1} \quad (11)$$

In a merge process for a partial quotient along with the process in the formula (9), by adopting as $Q_i$ the position of $P^{-(i-1)\alpha-1} \sim P^{-i\alpha}$, the result is that $Q_i$ is added with $P^{-(i-1)\alpha}$, and the negative quotient following $Q_i$ is converted into the positive one. In the formula (10), the negative quotient following $Q_{i-1}$ is corrected from $(P-1)$'s complement into P's complement.

From the above processings, a quotient can be obtained, which is clarified by proving the following items (A) to (E).

Item (A): A can be used for desired $i \geq 2$, and the number obtained through the formula (7) is the number obtained by multiplying the $i-1$th partial remainder $R_{1-1}$ by the approximate reciprocal divisor M.

Item (B): $Q_1$ is positive and has $\alpha \sim (\alpha+2)$ digits, and when compared above the position $P^{-\alpha}$ with the correct quotient, it is either equal to or larger by $P^{-\alpha}$. That is, $$P^{-1} < Q_1 \leq P \qquad (12)$$

$$-D_0 \times P^{-\alpha} < R_1 = \frac{Q_2 + N_2}{M} < D_0 \times P^{-\alpha} \qquad (13)$$

Item (C): Q ($i \geq 2$) may be either positive, zero, or negative, and has $\alpha$ digits at the position of $P^{-(i-1)\alpha-1} \sim P^{-i\alpha}$, and when compared at the position corresponding to $Q_i$ with the correct quotient Q, it is either equal to or larger by $P^{-i\alpha}$. That is, $$-P^{-(i-1)\alpha} < Q_i + N_i < P^{-(i-1)\alpha} \qquad (14)$$

$$-D_0 \times P^{-i\alpha} < R_i = \frac{Q_{i+1} + N_{i+1}}{M} < D_0 \times P^{-i\alpha} \qquad (15)$$

If Q is negative, in the corrected form of P's complement from $(P-1)$'s complement, it is compared with the correct quotient.

Item (D): the correction of $-P^{-i\alpha}$ for $Q_i$ is not introduced into the $Q_{i-1}$th and preceding partial quotients.

Item (E): the correction of $+P^{-i\alpha}$ for $Q_i$ is not introduced into the $Q_{i-1}$th and preceding partial quotients.

Demonstration of Item (A)

For $i=2$ $$Q_2 + N_2 = R_1 \times M$$
$$= (N_0 - D_0 \times Q_1) \times M$$
$$= N_0 \times M - D_0 \times Q_1 \times M$$
$$= Q_1 + N_1 - D_0 \times M \times Q_1$$
$$= (1 - D_0 \times M) \times Q_1 + N_1$$
$$= A \times Q_1 + N_1$$

so the item (A) is proved.

If it is assumed that the item (A) is proved for $i=k$ and that $$Q_k + N_k = R_{k-1} \times M$$
$$= A \times Q_{k-1} + N_{k-1}$$
then
$$Q_{k+1} + N_{k+1} = R_k \times M$$
$$= (R_{k-1} - D_0 \times Q_k) \times M$$
$$= \left(\frac{Q_k + N_k}{M} - S_0 \times Q_k\right) \times M$$
$$= Q_k + N_k - D_0 \times Q_k \times M$$
$$= (1 - D_0 \times M) \times Q_k + N_k$$

-continued
$$= A \times Q_k + N_k$$

so that the item (A) for $i=k+1$ is also proved. Since the item (A) for $i=2$ has previously been proved, by introducing a mathematical induction method, the item (A) for any desired $i \geq 2$ is proved.

Demonstration of Item (B)

Each term in the formula (4) is multiplied by the correct quotient Q, which yields $$Q \leq Q_1 + N_1 = N_0 \times M < Q + Q \times P^{-(\alpha+1)} \qquad (16)$$

and from the formula (3) $P^{-1} < Q < P$ and the formula (16),
$$P^{-1} < Q_1 < P$$
is established.

$$-P^{-\alpha} < R_1 \times M = Q_2 + N_2 = (1 - D_0 \times M) \times Q_1 + N_1 < P^{-\alpha} \qquad (17)$$

$(Q_1 < P, 0 < N_1 < P^{-\alpha}$
from the formula (4)
$-P^{-(\alpha+1)} < 1 - D_0 \times M \leq 0)$ Since it can be said from the formula (4) that $0 < 1/M \leq D_0$, and by multiplying the outer term of the inequality (17) by $D_0$ and the inner term by $1/M$, then the following formula is obtained.

$$-D_0 \times P^{-\alpha} < R_1 = \frac{Q_2 + N_2}{M} < D_0 \times P^{-\alpha}$$

Demonstration of Item (C)

The formula (14) can be established since from the formula (17) the following formula for $i=2$ is obtained.
$$-P^{-\alpha} < Q_2 + N_2 < P^{-\alpha}$$
If $Q_2 + N_2 \geq 0$, then $$-P^{-(2\alpha+1)} < -P^{-(\alpha+1)} \times Q_2 + N_2 < R_2 \times M = (1 - D_0 \times M) \times Q_2 + N_2$$

$$R_2 \times M = (1 - D_0 \times M) \times Q_2 + N_2 \leq N_2 < P^{-2\alpha}$$

$(\because Q_2 < P^{-\alpha}, 0 \leq N_2 < P^{-2\alpha}$,
from the formula (4)
$-P^{-(\alpha+1)} < 1 - D_0 \times M \leq 0)$ From the above two inequalities, and since $-P^{-2\alpha} < -P^{-(2\alpha+1)}$, then $$-P^{-2\alpha} < R_2 \times M = Q_3 + N_3 < P^{-2\alpha} \qquad (18)$$

Since it can be said the formula (4) that $0 < 1/M \leq D_O$, and by multiplying the outer term of the inequality (18) by $D_0$ and the inner term by $1/M$, $$-D_0 \times P^{-2\alpha} < R_2 = \frac{Q_3 + N_3}{M} < D_0 \times P^{-2\alpha}$$

therefore, the formula (15) for $i=2$ can be established.
If $Q_2 + N_2 < 0$, then $$-P^{-2\alpha} < N_2 \leq R_2 \times M = (1 - D_0 \times M) \times Q_2 + N_2$$

$$R_2 \times M = (1 - D_0 \times M) \times Q_2 + N_2 \leq (1 - D_0 \times M) \times Q_2 \{-P^{-(\alpha+1)}\}(-P^{-\alpha})$$

In this case, since $\{-P^{-(\alpha+1)}<\}(-P^{-\alpha})=P^{-(2\alpha+1)}<P^{-2\alpha}$, the formula (18) is obtained as similar to the case of $Q_2+N_2\geq 0$, and the succeeding demonstration is the same as in the case of $Q_2+N_2\geq 0$.

From the above the item (C) for $i=2$ is proved. For $i=k$ $$-P^{-(k-1)\alpha}<Q_k+N_k<P^{-(k-1)\alpha} \tag{19}$$

$$-D_0\times P^{-k\alpha} < R_k = \frac{Q_{k+1}+Q_{k+1}}{M} < D_0\times P^{-k\alpha} \tag{20}$$

are assumed to be established, then for $Q_k+N_k\geq 0$, $$-P^{-k\alpha}<-P^{-(k\alpha+1)}<-P^{-(\alpha+1)}Q_k+N_k$$
$$<Q_{k+1}+N_{k+1}=(1-D_0\times M)\times Q_k+N_k$$

$$Q_{k+1}+N_{k+1}=(1-D_0\times M)\times Q_k+N_k\leq N_k<P^{-kn}$$

($\because Q_k<P^{-(k-1)\alpha}$, $0\leq N_k<P^{-k\alpha}$,
from the formula (4)
$-P^{-(\alpha+1)}<1-D_0\times M\leq 0$)

The above two inequalities are combined to obtain the formula (21).

$$-P^{-K\alpha}<Q_{k+1}+N_{k+1}<P^{-k\alpha} \tag{21}$$

for $Q_k+N_k<0$, $$-P^{-k\alpha}<N_k\leq Q_{k+1}+N_{k+1}=(1-D_0\times M)\times Q_k+N_k$$

$$Q_{k+1}+N_{k+1}=(1-D_0\times M)\times Q_k+N_k<\{-P^{-(\alpha+1)}\}\{-P^{-(k-1)\alpha}\}$$
$$=P^{-(k\alpha+1)}<P^{-k\alpha}$$

The above two inequalities are combined to obtain the formula (21).

From the above, the formula (14) for $i=k+1$ can be established.

Since the formula (14) has been proved for $i=2$, by introducing a mathematical induction method, the formula (14) can be established for all i's where $i\geq 2$.

By substituting in the formula (22) $i=k+2$, then the formula (22) is obtained.

$$-P^{-(k+1)\alpha}<Q_{k+2}+N_{k+2}<P^{-(k+1)\alpha} \tag{22}$$

Since it can be said from the formula (4) that $0<1/M\leq D_0$, by multiplying the outer term of the formula (22) by $D_0$ and the inner term by $1/M$, the formula (23) can be obtained.

$$-D_0\times P^{-(k+1)\alpha} < R_{k+1} = \frac{Q_{k+2}+N_{k+2}}{M} < D_0\times P^{-(k+1)\alpha} \tag{23}$$

This shows that the formula (15) can be established for $i=k+1$. Since the formula (15) for $i=2$ has previously been proved, by introducing a mathematical induction method, the formula (15) can be established for any desired i where $i\geq 2$.

Demonstration of the Item (D)

The correction of $-P^{-i\alpha}$ is brought about while $Q_i+N_i\geq 0$, $Q_{i+1}+N_{i+1}<0$, however, since $Q_{i+1}+N_{i+1}$ is obtained from $$Q_{i+1}+N_{i+1}=(1-D_0\times M)\times Q_i+N_i$$

$$(-P^{-(\alpha+1)}<1-D_0\times M\leq 0)$$

it becomes $Q_i\neq 0$. The reason is that $Q_{i+1}+N_{i+1}$ can not be negative at $Q_i0$. Since $Q_i\neq 0$, the correction of $-P^{-i\alpha}$ is not introduced into the $Q_{i-1}$ and preceding partial quotients.

Demonstration of the Item (E)

The correction of $+P^{-i\alpha}$ is brought about while $Q_1+N_i<0$, $Q_{i+1}+N_{i+1}\geq 0$. Since the correction of $+P^{-i\alpha}$ is introduced into from $Q_i$ to $Q_{i-1}$, all of the digits of $Q_i$ have to be $P-1$. At this time, since $Q_i$ is represented as a complement of $P-1$, and in the successive iterations it is converted into a complement representation of $P$, $Q_i$ becomes zero.

$$Q_{i+1}+N_{i+1}=(1-D_0\times M)\times Q_i+N_i$$

$$(-p^{-(\alpha+1)}<1-D_0\times M\leq 0)$$

Since $Q_{i+1}+N_{i+1}$ is obtained from the above formula, in the case $Q_i$ is zero, $Q_{i+1}+N_{i+1}$ becomes equal to $N_i$ and remains negative. Therefore, since all of the digits of $Q_i$ do not become $P-1$ while $Q_{i+1}+N_{i+1}$ is positive, the correction of $+P^{-i\alpha}$ is not introduced into the $Q_{i-1}$ and preceding partial quotients.

Figure 1:
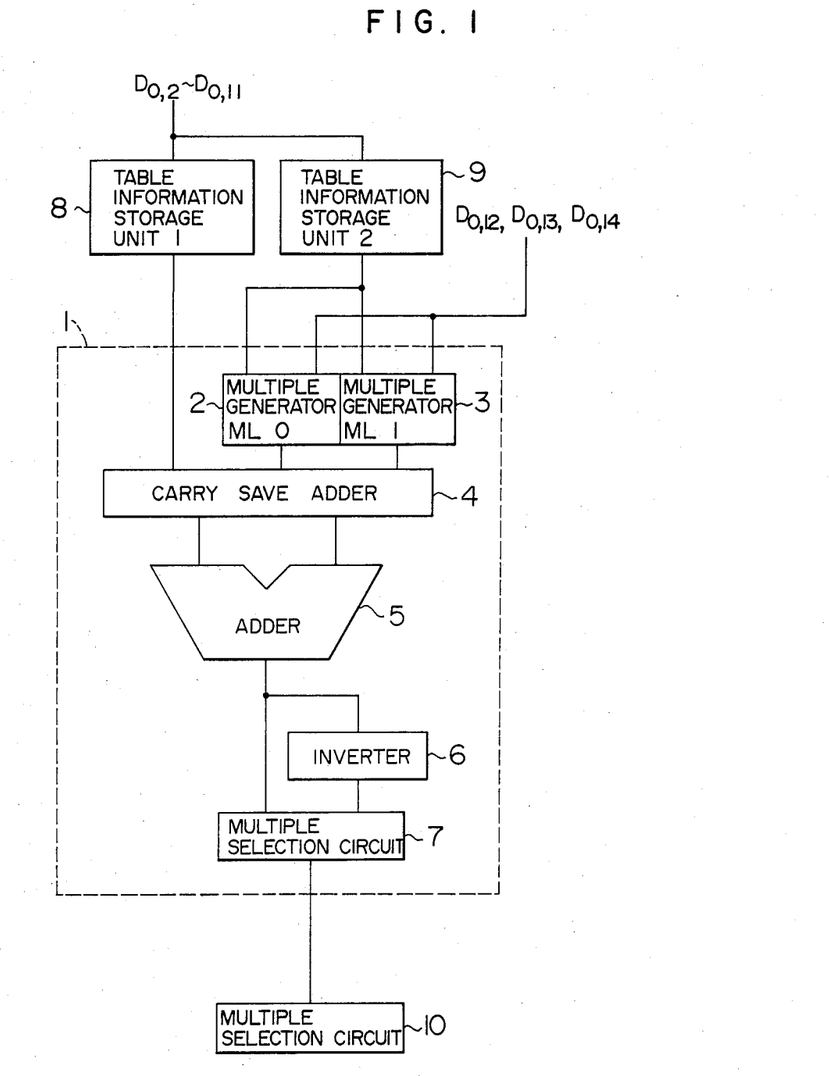
FIG. 1 is a block diagram showing a table information storage unit and an interpolation approximation circuit.
Figure 2:
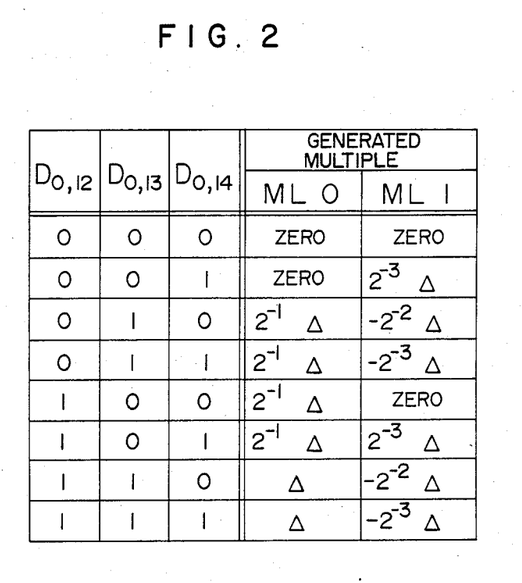
FIG. 2 is a table showing a relation between the input and output of a multiple generator shown in FIG. 1.

One embodiment of the present invention will now be described in detail with reference to the accompanying drawings. FIG. 1 shows a block diagram of an interpolation approximation circuit. In FIG. 1, the interpolation approximation circuit 1 comprises multiple generators 2, 3, carry save adder 4, adder 5, inverter 6, and multiplier selection circuit 7. The relation between the input and output of the multiple generators 2, 3 is shown in FIG. 2. Table information storage units 8, 9 are connected at the input side of the interpolation approximation circuit 1, and a multiplier selection circuit 10 is connected to the output side. The table information storage unit 8 stores the approximate reciprocal divisor $M_0$, and the unit 9 stores the difference $\Delta$.

An example of a method for retrieval of stored information in the table information storage units 8 and 9 is as follows.

For the binary divisor represented by the formula (1), by using $$\frac{1}{2^{-1}+\sum_{k=2}^{11}D_{0,k}\cdot 2^{-k}} = 1 + \sum_{k=1}^{\infty}M_{0,k}\cdot 2^{-k} \tag{24}$$

the approximate reciprocal divisor $M_0$ and the difference are obtained as:

$$M_0 = 1 + \sum_{k=1}^{19}M_{0,k}\cdot 2^{-k} + 2^{-19} \tag{25}$$

$$\Delta = \text{(difference between adjacent } M_0\text{'s)} \tag{26}$$

Since the position of $2^0$ of $M_0$ and the positions higher than and including $2^{-8}$ of $\Delta$ indicative of the negative sign are fixed, these are not required to be stored in the table, but these can be added when the table is accessed.

However, $D_0=2^{-1}$ ($D_{0,2}\sim D_{0,11}$ are all "0") is used as an address of the table, particular values for $M_0$ and are output as:

$$M_0 = 1.\text{FFFFE(Hexadecimal)} \tag{27}$$

$$\Delta = \ldots FF.FF822 \text{ (Hexadecimal)} \quad (28)$$

After $M_0$ and $\Delta$ are read out of the table information storage units 8 and 9 by using 10 bits of the normalized divisor from $D_{0,2}$ to $D_{0,11}$ as an address for retrieving the table information, the interpolation approximation is performed by using the bits $D_{0,12}$, $D_{0,13}$, $D_{0,14}$ following the above table address bits, and this time, the number to be added is reduced by one by using the multiple generators 2 and 3 shown in FIG. 1. $M_0$ from the table inforamation storage unit 8 and two multiples $ML_0$ and $ML_1$ from the multiple generators 2 and 3 are combined in two values by the carry save adder 4, and thereafter are combined into a single value by the adder 5. The addition is performed for the positions higher than $2^{-20}$, and from the interpolation approximation circuit 1, the number obtained by adding $(1-D_{0,15})$ to the positions higher than 2 obtained from the addition result is output as the $2^{-16}$ position. The $2^{-16}$ position is the lowest bit of the multiplier bit, and in accordance with the multiple generation theory of the multiplier, the $2^{-16}$ position has an effect of $+2^{-15}$ while the 2 position is 1. Therefore, although the multiplier at $D_0=2^{-1}$ becomes 1.FFFF (hexadecimal), the substantial multiplier becomes 2 because the effect of $+2^{-15}$ in the multiplier device is obtained due to the fact that the $2^{-16}$ position is 1.

The inverter 6 is used in the case that the approximate reciprocal divisor is directly multiplied as a negative number, and the multiplier circuit 7 in the interpolation circuit 1 is a circuit for selecting either a positive or negative sign for the approximate reciprocal divisor.

By virtue of the above interpolation approximation, the accuracy of the approximate reciprocal divisor suffices the formula (29) and it is improved by three digits in binary notation.

$$1 \leq D_0 \times M < 1.0007 \text{ FF8 (hexadecimal)}$$

Figure 3:
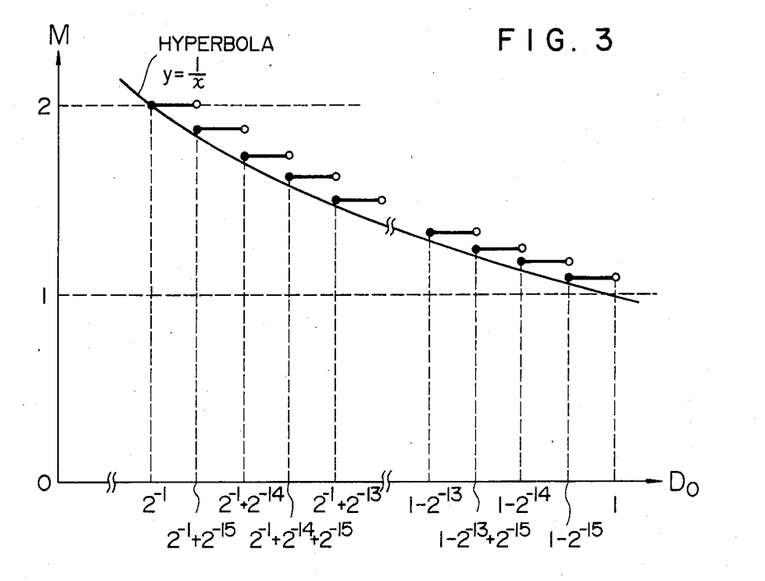
FIG. 3 and FIG. 4 are graphs for explaining the accuracy of interpolation approximation according to one embodiment of the present invention.
Figure 4:
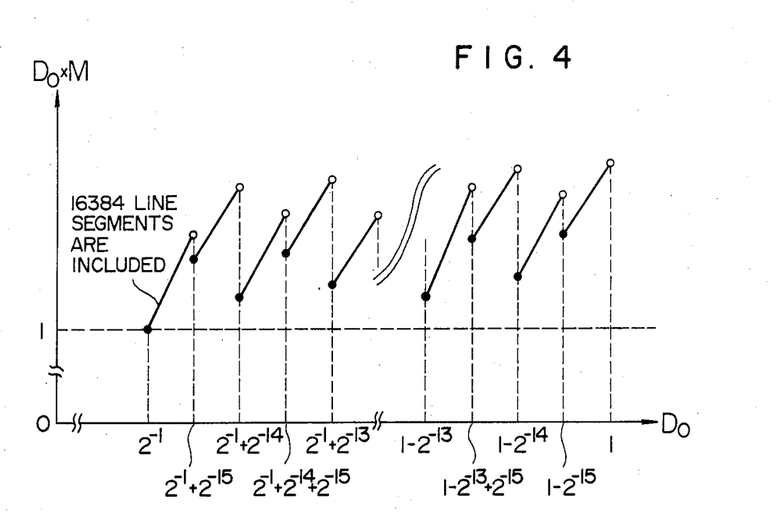

The value of $D_0 \times M$ has been affirmed with a computer, and the method of affirmation will be summarized as follows.

$$\left(2^{-1} + \sum_{k=2}^{15} D_{0,k} \cdot 2^{-k}, 2^{-1} + \sum_{k=2}^{15} D_{0,k} \cdot 2^{-k} + 2^{-15}\right),$$

and within $2^{-1} \leq D_0 < 1$, it becomes as shown in FIG. 3 a step function with $2^{14}=16384$ line segments of $2^{-15}$ length, while the graph for $D_0 \times M$ as shown in FIG. 4 has 16384 line segments in the form of a saw tooth. Therefore, Lower limit (also the minimum value) of $D_0 \times M$: the minimum value at the left end 16384 line segments Upper limit of $D_0 \times M$: the maximum value of the right end of 16384 line segments An embodiment of a divide apparatus according to the present invention is shown as a block diagram of FIG. 5. In the figure, the table information storage unit 17 includes both units 8 and 9 shown in FIG. 1, and the interpolation approximation circuit 18 is identical with that represented by reference number 1 in FIG. 1. The multiplier selection circuit 10 in FIG. 1 is represented by reference number 16 in FIG. 5. The division is performed in the following sequence, and the control for the whole system is carried out by a control circuit 11.

Figure 5:
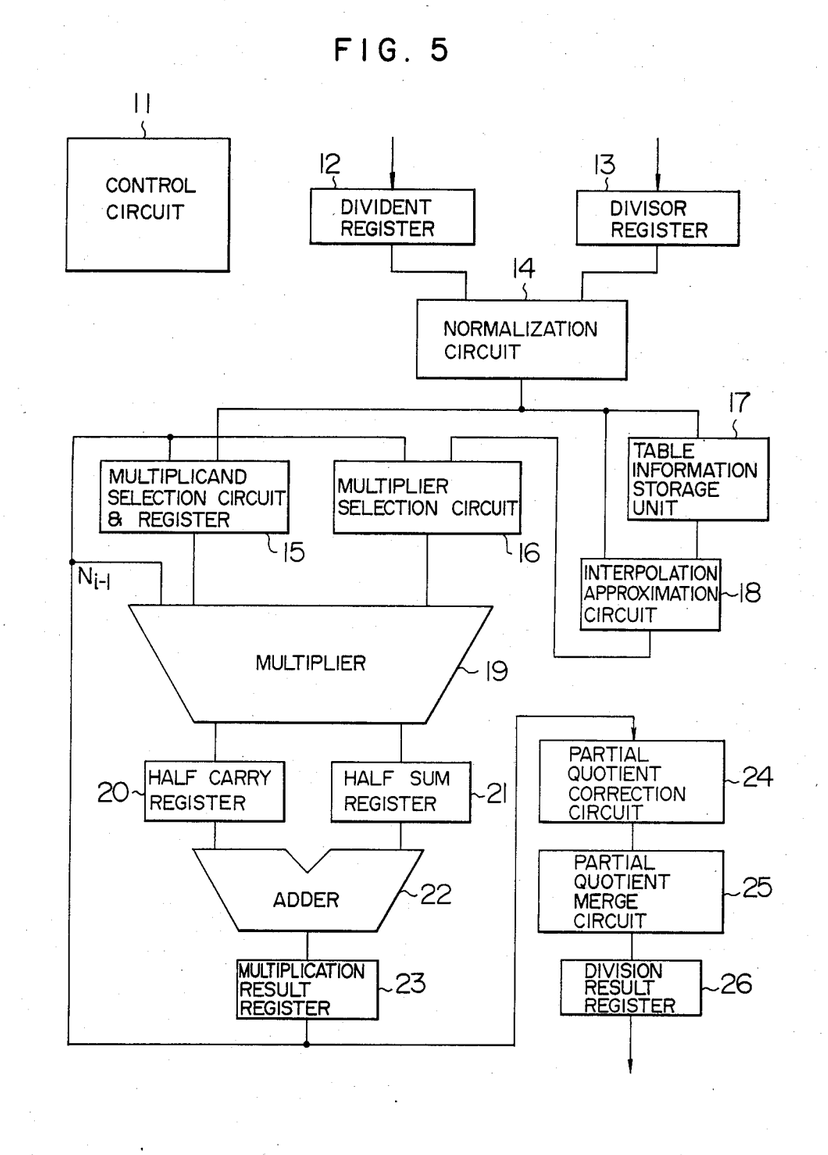
FIG. 5 is a whole block diagram showing the divide apparatus according to one embodiment of the present invention.

The divisor set in a divisor register 13 is normalized in a normalizing circuit 14. By using the high order bits of the normalized divisor, the approximate reciprocal divisor and difference and read out from the table information storage unit 17, and the normalized divisor $D_0$ is set in a multiplicand selection circuit and register 15.

After improving the accuracy of the approximate reciprocal divisor by an interpolation approximation circuit 18, first $-M$ is output. $-M$ is selected by a multiplier selection circuit 16 to perform the multiplication of $D_0 \times (-M)$ in the formula (5) by a multiplier 19. In this case, a half carry and half sum are set in respective resistors 20 and 21, and thereafter are combined in one by an adder 22, the product being set in a multiplication result register 23.

Figure 6:
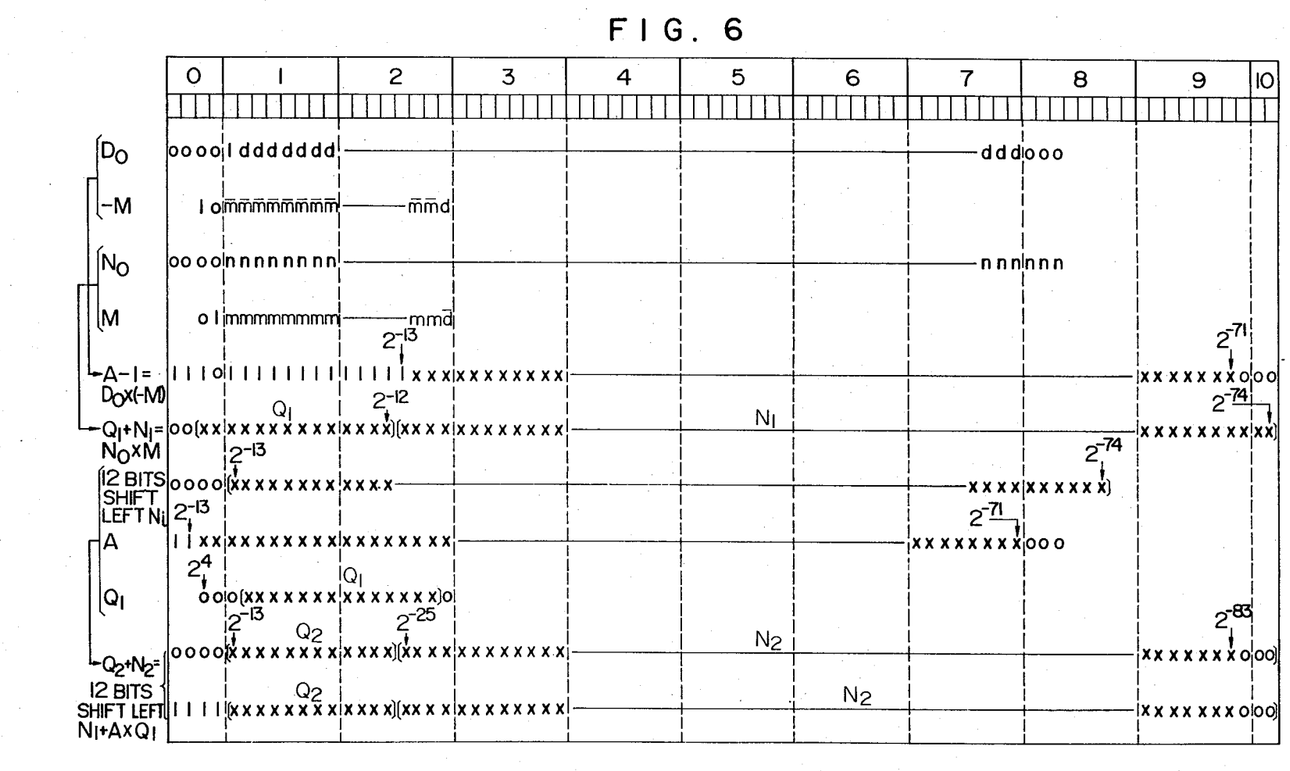
FIG. 6 and FIG. 7 are schematic diagrams for explaining particular operations according to the present invention.

Next, after normalizing the dividend set in a dividend register 12 by the normalization circuit 14, the dividend $N_0$ is set in a multiplicand selection circuit and register 15. The interpolation approximation circuit 18 outputs $M$ which is selected by the multiplier selection circuit to perform the multiplication of $N_0 \times M$ in the formula (6). The product of $N_0 \times M$ is set in the half carry register 20 and the half sum register 21, and concurrently therewith, the product of $D_0 \times (-M)$ in the multiplication result register 23 is set in the multiplicand selection circuit and register 15. In the formula (5), it is shown as adding 1 to $D_0 \times M$ to obtain A, however, since the positions higher than $2^{-13}$ is represented by a negative sign bit after addition of 1, the divide apparatus uses a dividend A which is the bits lower than $2^{-12}$ of $D_0 \times M$. The digit of $2^{-12}$ is used as 2 sign bit, whereby the register 15 is correctly set to zero in the case of $D_0 = 2^{-1}$ where A become zero. Thereafter, the product of $N_0 \times M$ is set in the multiplication result register 23. $N_0 \times M$ is as shown in the formula (6) $Q_1 + N_1$, and as shown in FIG. 6, the bits higher than $2^{-12}$ are $Q_1$ while the bits $2^{-13}$ to $2^{-14}$ are $N_1$.

Succeedingly, successive iterations are performed as in the formula (7), and concurrently therewith, the correction of partial quotients as in the formulas (8) to (11) is carried out in a partial quotient correction circuit 24, and the corrected partial quotients are merged in a partial quotient merge circuit 25.

In the successive iterations, the higher order partial quotients $Q_{i-1}$ resulted from the multiplication are selected by the multiplier selection circuit 16, and also the lower order partial quotients $N_{i-1}$ resulted from the multiplication are input as a kind of a multiple into the multiplier 19, thereby adding to $A \times Q_{i-1} \cdot N_{i-1}$ is input after it is shifted 12 bits left. The successive iterations are repeated for the required times, and the final merged quotient is set in a division result register 26.

The number of successive iterations are two in a single precision floating point number with 24 bits at a mantissa, while in a double precision floating point number with 56 bits at a mantissa, the number are five.

Figure 7:
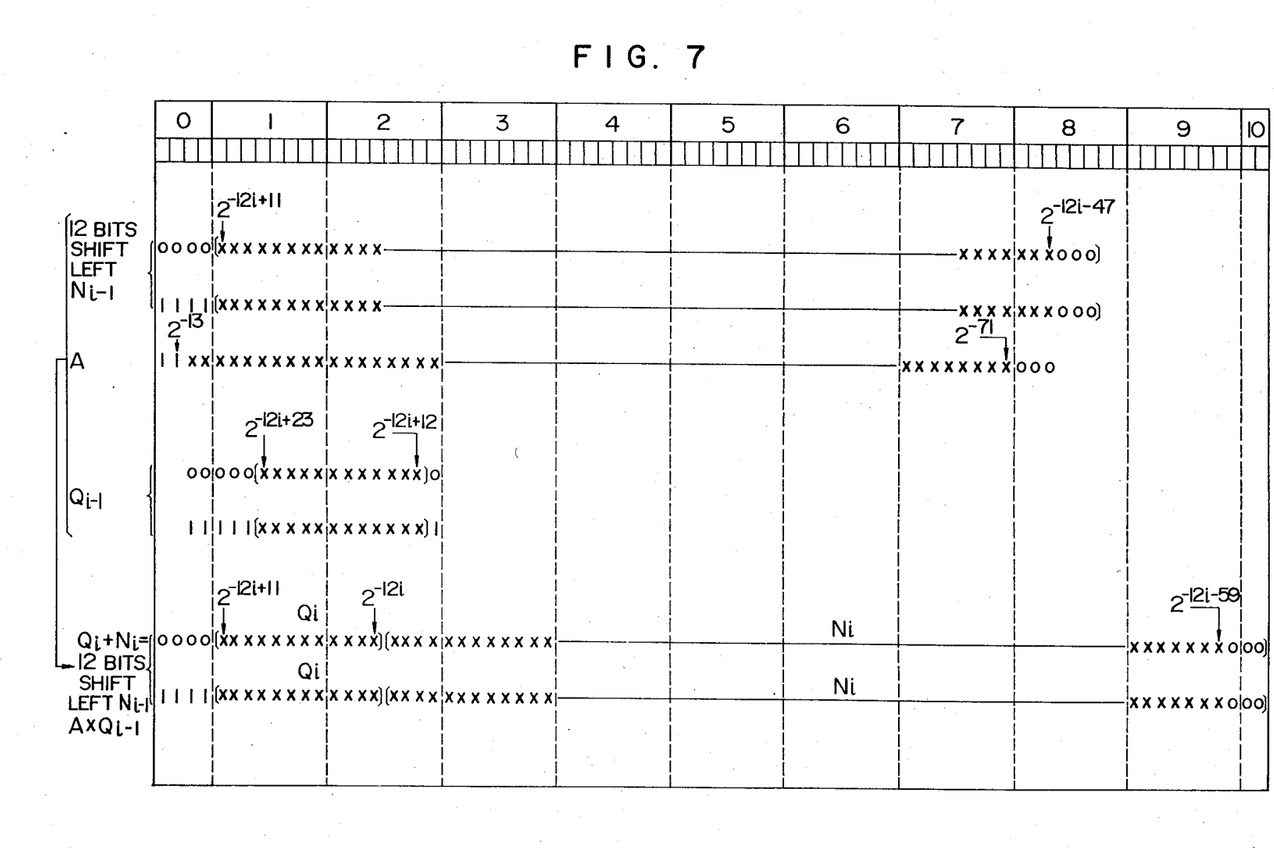

How the above calculation is dealt with in association with an actual number, is shown in FIGS. 6 and 7. The example shown in FIGS. 6 and 7 employs a dividend and a divisor of 14 digits in hexadecimal (56 bits). After normalizing in the form of a hexadecimal, the dividend and divisor are shifted left by the number of bits required for normalizing the divisor, and if the dividend overflows left from the position of $2°$, it is shifted by 4 bits right. As a result, $N_0$ is 59 bits.

As shown in FIGS. 6 and 7, in the successive iterations, if $Q_{i-1}$ and $N_{i-1}$ are negative, it is required that negative signs are added at the top and that for $Q_{i-1}$, and that for $Q_{i-1}$, 1's complement is corrected into 2's complement by adding 1 to the lowest bit of the multiplier. In FIG. 6, with respect to $Q_2 + N_2$, the upper one is for a negative or zero case, while the lower one is for a negative case. Similarly, in FIG. 7, with respect to $N_{i-1}$, $Q_{i-1}$, and $Q_i+N_i$, the upper one is for a positive or zero case, while the lower one is for a negative case. Further, i is any positive integer sufficing $i \geq 3$.

The partial quotient correction circuit 24 performs a correction shown by the formulas (8) to (11). It is understood in conclusion that the formulas (8) to (11) detect the sign. Therefore, as data to be copied from the multiplication result register 23 to the partial quotient correction circuit 24, only $Q_i$ and a sign will be quite enough. More in particular, in the case of the lower most $Q_2+N_2$ in FIG. 6, since the sign can be identified by $2^0$ bit, $2^0$ indicative of the sign and $Q_2$ of 12 bits are used. The partial quotient circuit 25 receives every 12 bit partial quotients from the partial quotient correction circuit 24, and merges so as not to overlap the bits of every 12 bit partial quotients.

An actual example of the division will now be described in the following by illustratively taking a divisor $D_0$ and a divident $N_0$ as:
$D_0 = 0.91A2B400$ (hexadecimal)
$N_0 = 0.48D159E26AF37BC0$ (hexadecimal)
(i) The upper 11 bits of $D_0$ are
0.91A (hexadecimal) = 0.1001 0001 101 (binary)
and $$\frac{1}{0.1001\ 0001\ 101} = 1.1100\ 0010\ 0000\ 1000\ 010\ldots$$

$$\frac{1}{0.1001\ 0001\ 110} = 1.1100\ 0001\ 1010\ 0101\ 100\ldots$$

so that the following numbers are output as table information.
$M_0 = 1.1100\ 0010\ 0000\ 1000\ 011$ (binary)
$= 1.C2086$ (hexadecimal)
$\Delta = \ldots 1111.1111\ 1111\ 1001\ 1101\ 010$ (binary)
$= \ldots F.FF9D4$ (hexadecimal)
Since $D_{0,12}=D_{0,13}=D_{0,14}=0$, $D_{0,15}=1$, the interpolation approximation becomes all zero, and the value of M used as a final approximate reciprocal divisor is:
$M = 1.C208$
$-M = \ldots FE.3DF8$
(hereinafter, hexadecimal notation is used unless otherwise specified)

$$A = 1 + D_0 \times (-M) \qquad (ii)$$

$$= \ldots FF.FFFB72826$$

$$Q_1 + N_1 = N_0 \times M \qquad (iii)$$

$$= 0.8002468ACF1357235E0$$

$Q_1 = 0.800$ $N_1 = 0.0002468ACF1357235E0$ $16^3 (Q_2 + N_2) = 16^3 (A \times Q_1 + N_1)$ $$= \ldots FF.FFFCBFF1357235E$$

$16^3 Q_2 = \ldots FF.FFF$ $16^3 N_2 = \ldots FF.FFFCBFF1357235E$ $Q_1^* = 0.800 - 0.001$ $= 0.7FF$ $16^6 (Q_3 + N_3) = 16^6 \{A \times (Q_2 + 16^{-3}) + N_2\} \qquad (v)$ $= 16^6 N_2$ $= \ldots FF.CBFF1357235E$ $16^6 Q_3 = \ldots FF.CBF$ $16^6 N_3 = \ldots FF.FFFF1357235E$ $16^3 Q_2^* = 0.FFF$ $16^9 (Q_4 + N_4) = 16^9 \{A \times (Q_3 + 16^{-9}) + N_3\} \qquad (vi)$ $= 0.000\ 14A7DE$ $16^6 Q_3^* = 0.CBF + 0.001$ $= 0.CC0.$ From the above, assuming to use 8 digits as a quotient, the results are:
quotient: 0.7FFFFFCC
remainder multiplied by M: 0.00000000000014A7DE In the above description of the embodiment according to the present invention, the partial quotient and partial remainder have been obtained by repeatedly using the same circuits. However application is also possible to a vector divide apparatus of the type in which circuits for obtaining the same number, as that of required repetitions, of partial quotients and partial remainders are disposed by pipelining, and the quotient between corresponding elements of a vector can be obtained every one clock.

According to the present invention, in order to improve the accuracy of an approximate reciprocal divisor, only one multiplication is required while in the prior art two multiplications have been required. In some cases, it takes nearly the same time as required in one addition. Further, although conventionally the check and correction has been effected at the time when the same length quotient as the final quotient is obtained, the check and correction of the quotient according to the present invention can be introduced into the successive iterations so that the execution time for the division is effectively shortened. More in addition, the correction of a partial quotient is not associated with the higher order partial quotients. Therefore, an earlier decision whether normalization of the division result is required or not can be made at the time when the correction of the first quotient is completed.

I claim:
1. A divide apparatus comprising:
normalizing means for normalizing a divisor and a dividend;
table means for storing a plurality of approximate reciprocal divisors, said table means further storing differences, corresponding to respective ones of said approximate reciprocal divisors, between said respective ones and adjacent others of said approximate reciprocal divisor, and outputting said approximate reciprocal divisor difference by using the high-order bits of the normalized divisor from said normalizing means as an address of said table means;
interpolation approximation circuit means for outputting an approximate reciprocal divisor obtained through interpolation approximation in accordance with said approximate reciprocal divisor and difference from said table means and a plurality of bits following said high-order bits of the normalized divisor as the address of said table means; and multiplier means input with said normalized divisor and dividend and the interpolation approximated approximate reciprocal divisor from said interpolation approximation circuit means for outputting a quotient through multiplication.

2. A divide apparatus according to claim 1, wherein said interpolation approximation circuit means includes:

circuit means for proportionally allotting said difference in accordance with a plurality of bits following the high-order bits of said normalized divisor as the address of said table means and for outputting a difference proportionate to the value of said plurality of bits; and addition means for adding said proportional difference to said approximate reciprocal divisor and for outputting an interpolation approximated approximate reciprocal divisor.

3. A divide apparatus according to claim 2, wherein said circuit means includes means for generating a multiple of said difference represented by the number of said plural bits.

4. A divide apparatus according to claim 1, wherein said multiplication means has means for inputting the multiplication result output so as to perform successive iterations.

5. A divide apparatus according to claim 4 further including partial quotient correction means connected to said multiplication means for correcting the partial quotient obtained at each successive iteration by said multiplication means.

6. A divide apparatus according to claim 1 further including partial quotient correction means connected to said multiplication means for correcting the partial quotient from said multiplication means.

7. A divide method for use in a data processing system which has a normalization circuit for normalizing an operand, a table unit for storing a plurality of approximate reciprocal divisors $M_0$ and differences $\Delta$, corresponding to respective ones of said approximate reciprocal divisors, between said respective ones and adjacent others of said approximate reciprocal divisors, an interpolation approximation circuit, a multiplication unit, and a partial quotient correction circuit, comprising the steps of:

outputting a normalized divisor $D_0$ and a normalized dividend $N_0$ normalized both by said normalization circuit;

addressing said table unit by the high-order bits of said normalized divisor $D_0$ in order to access said approximate reciprocal $M_0$ and difference $\Delta$;

adding a difference proportionate to the value of plural bits following said high-order bits of the normalized divisor as the address of said table unit to said difference $\Delta$ in order to obtain an interpolation approximated approximate reciprocal divisor M in said interpolation approximation circuit;

multiplying in said multiplication unit said normalized divisor $D_0$ by said interpolation approximated approximate reciprocal divisor M;

performing $1 - D_0 \times M$ in said multiplication unit in order to obtain A by using said $D_0 \times M$;

multiplying in said multiplication unit said normalized dividend $N_0$ by said interpolation approximated approximate reciprocal divisor M in order to obtain $Q_1 + N_1$ as a partial quotient $Q_1$; and performing in said multiplication unit successive iterations of $A \times Q_{i-1} + N_{i-1}$ in order to obtain $Q_i + N_i$.

8. A divide method according to claim 7 further including a step of correcting in said partial quotient correction circuit a partial quotient obtained at each successive iteration.

* * * * *